Figure 1:
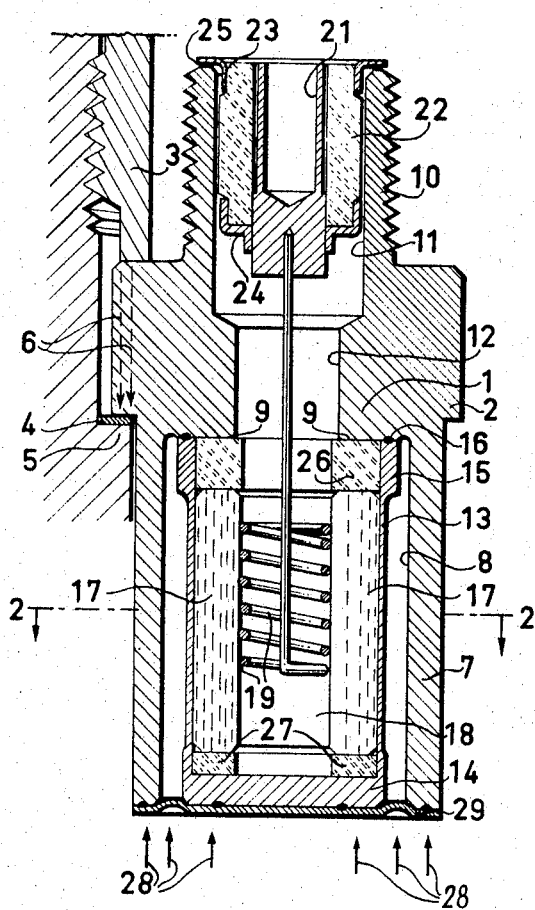

April 11, 1967     H. C. SONDEREGGER     3,313,962

PIEZO-ELECTRIC TRANSDUCER

Filed Nov. 17, 1964

INVENTOR

Hans Conrad Sonderegger

BY Dicke & Craig

ATTORNEYS

United States Patent Office 3,313,962
Patented Apr. 11, 1967

3,313,962
PIEZO-ELECTRIC TRANSDUCER
Hans Conrad Sonderegger, Winterthur, Switzerland, assignor to Messrs. Kistler Instrumente A.G., Winterthur, Switzerland
Filed Nov. 17, 1964, Ser. No. 411,765
5 Claims. (Cl. 310—9.7)

The invention relates to a piezo-electric transducer comprising several crystal elements assembled in a pressure casing, the crystal elements having surfaces which face each other and define an inner space. The surfaces essentially run in the directions of the neutral and optical crystal axes of which the neutral axes are directed parallel to the axis of the inner space.

It is the object of the invention in such a crystal arrangement to take off the charges from the facing surfaces of the crystal elements. For taking off the charges a contact is required which under all working conditions definitely bears against these surfaces without exerting a pressure thereon, which would impair the measuring properties of the transducer. Furthermore, it should be possible to produce such a contact in a quite simple manner. The contacts known up to now in such crystal arrangements lack these requirements. Contacts having resilient fingers contacting the crystal surfaces are sensitive to vibrations and thus do not always ensure a satisfactory contact. Foils for taking off the charges, as they are used in transducers with disk-like crystal elements can only be used in transducers of the above referred kind if the internal space is filled with an elastic material as it is the case in a known transducer where this elastic material serves for the transmission of forces. In the transducer of the present invention the facing surfaces of the crystals shall, however, remain unaffected by forces.

According to the invention the problem to provide a definite and easily producible contact to the facing surfaces of the crystals is solved in that for taking off the charges from the facing and at least partially metal-plated surfaces of the crystal elements a common helically wound electrode is provided, which is screwed into the inner space and after having reached its end position is tightened and screwed by rotating it against its direction of coiling.

The construction according to the invention ensures under all working conditions satisfactory transfer of the charges by means of the helically constructed electrode. Such an electrode is insensitive against vibration; it can further be easily assembled and requires no zones of soldering to the conductive crystal surface. The pressure exerted by the electrode in the manner of a spring in the radial direction on the crystal arrangement further produces a smooth bearing of the crystal surface against an electrode serving for leading off the charges of the other polarity, which electrode can be formed for example by the device casing or by a sleeve-like tubular spring surrounding the crystal arrangement.

In an especially preferred embodiment of the invention the crystal elements viewed in cross-section have essentially the form of a section of a circle. The at least partially plated outer surface of each section is in direct contact with the pressure casing while the inner flat surfaces of the sections define a prismatic inner space into which the helical electrode is screwed, which presses at the same time the crystal elements with their outer surfaces against the wall of the pressure casing. Each one of the three piezo-electric crystal elements in form of a section of a circle is preferably ground from a rectangular crystal prism. The edges between the outer surfaces of the crystal elements and their inner surfaces are chamfered so that two parallel surfaces between the outer surface and the inner section surface are generated, which serve as insulation surfaces and are not plated.

The application of a helical electrode for taking off the charges furthermore makes it possible, according to a further feature of the invention, to provide the individual crystal elements with different apex heights of the circular section and to select the crystal elements in respect to their apex heights in such a manner that the sum of their piezo-modulus corresponds to a predetermined value.

For assembling the transducer according to the invention it is especially advantageous, according to a further feature of the invention, to anchor the end of the contact spring projecting from the crystal assembly to an insulator which is non-rotatably connected with the casing.

Figure 3:
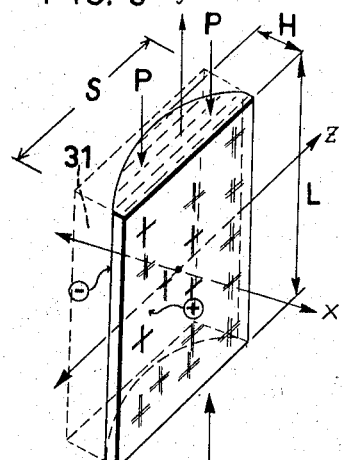
Figure 4:
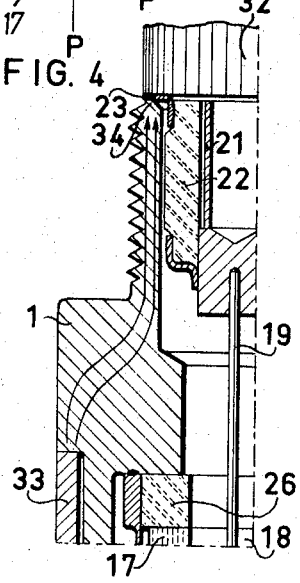
Figure 2:
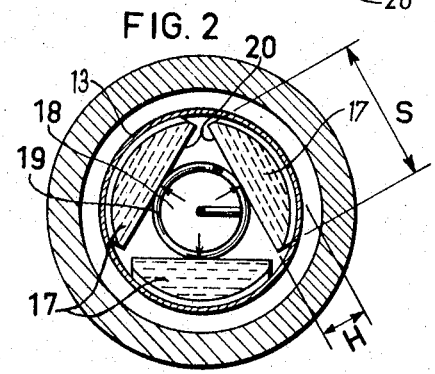
Figure 5:
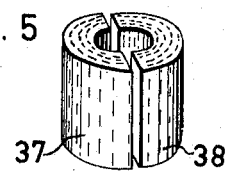

The features of the invention and further features appendant thereto are further explained on the basis of the embodiment shown in the accompanying drawing, wherein:

FIG. 1 shows a section through a piezo-electric transducer according to the invention, FIG. 2 is a cross-section on the line 2—2 in FIG. 2, FIG. 3 shows an individual crystal element of the crystal arrangement according to FIGS. 1 and 2, FIG. 4 shows in detail the welding of the device casing with an insulator carrying the helical contact spring, and FIG. 5 shows a crystal arrangement consisting of two hollow cylindrical half shells.

The transducer shown in FIG. 1 comprises the casing 1 produced from steel and provided with a clamping flange 2. In the assembled condition of the device the flange 2 is pressed by means of the nipple 3 onto the seal 4, which rests against a shoulder-like seating of the wall 5. This arrangement provides a very short path for the clamping forces; in particlar this path indicated by the arrow 6 is located also outside of the parts used for transmission of the measuring forces, which essentially increases the accuracy of the transducer signal.

The casing 1 comprises a lower part 7 the inner wall of which merges into an accurately worked surface 9 standing perpendicularly to the longitudinal axis of the device. The upper part 10 of the casing comprises a bore 11 which is associated through the opening 12 with the internal space of the lower part of the casing surrounded by the wall 8.

The lower part 7 of the casing serves for receiving the piezo-electric crystal unit. This comprises a very thin walled tubular spring 13 which has a wall thickness of about one or only a few mils and forms, together with the base part 14 serving as a pressure plunger, a chamber for receiving the crystal arrangement. At the open end of this chamber the tubular spring 13 embodies a thickened projection 15 which serves as a welding ring for welding the tubular spring and the casing surface 9 by means of a ring ridge weld 16.

The crystal arrangement located inside the tube spring consists of three individual crystal elements 17 of quartz or other piezo-electric material, which surround the free inner space 18 and as shown in FIG. 2 embody substantially a cross-section in form of a section of a circle. The transverse piazo effect is utilised whereby the positive electrical charges are taken off the flat crystal surfaces 20 provided with an evaporated metal plating by means of a contact spring 19 constructed in helical form of a wire spiral. The negative charges are taken directly to the casing 1 through the tubular springs 13. The positive charges pass through the central conductor of the contact spring 19 into the bush 21 serving for receiving a plug, not shown. The bush is mounted in a ceramic insulator 22 inserted in part 10 of the casing 1 and hard soldered at its end parts into metal mounts 23 and 24. The top metal mount 23 is constructed as a welding flange and on assembly of the device is welded completely tight with the part 10 of the casing by means of a ring ridge weld 25.

In order to compensate the various co-efficients of expansion, as well as for protecting the crystal elements against excessive temperature peaks when using the device in hot media, two ceramic rings 26 and 27 are provided with accurately chosen co-efficients of expansion. The diaphragm 29 serving for transmitting the measuring pressure represented by the arrow 28 is welded to the bottom—likewise by ring ridge welding. The edge part of the diaphragm is welded in the same way with the part 7 of the casing, directed towards the inside of the device.

The transducer shown utilises as already stated the transverse piezo effect, whereby the electrical charges are taken off perpendicularly to the direction of the force P as shown in FIG. 3. The optical axis is marked $z$ and the electrical axis is marked $x$. The neutral axis $y$ coincides with the direction of the force P. The apex height H of the crystal cross-section amounts to less than 1/3 of the chord length S while the axial length L amounts to a multiple of the chord length. The crystal elements are ground from rectangular quartz prisms as indicated by the dotted line 31. Also the cylindrical surfaces from which the negative charges flow to the tube spring as well as the flat surfaces 20 are provided with an evaporated metal layer. On assembly of the transducer first all parts up to the insulating body 22, with the contact spring 19 carried by it, are installed. The tubular spring 13 is conveniently under pre-stressing such that the crystal arrangement is always subjected to a pre-stressing pressure, which then permits low pressure to be measured also.

Thereupon the contact spring 19 firmly anchored in the lower part of the sleeve 21 is introduced into the bore 11 and through the opening 12 and then the wire turns are so rotated in the winding sense that the winding diameter is reduced and the spring can be introduced into the inner space 18. If the spring is then screwed in up to the right depth between the crystal elements 17, it is rotated in the opposite direction whereupon the winding diameter tends to increase and the spring 19 is forced against the surfaces 20 of the crystal elements.

Then, as shown in FIG. 4, the mounting 23 is welded to part 10 of the casing. For this purpose the mounting 23 is pressed against the casing by means of the welding electrode 32, the counter electrode 33 being supported on the other hand against the casing. On starting the welding current impulse the part 10 of the casing forming at its upper end a ridge 34 is welded tightly against the metal mounting 23. Conveniently the welding is effected in an evacuated space or in a space filled with a pure gas.

Conveniently before the assembly of the transducer, the piezo modulus, that is the electric charge per 1 kg. force of each individual quartz crystal element is determined in order to build sets consisting of three crystal elements each, the sum of the piezo moduli of each set corresponding to a definite value. For this purpose quartz elements are produced in manufacture with slight variations in the apex height "H." By corresponding examination and grouping it is possible to secure a sensitivity of the transducer in quantity production, which corresponds to a quite definite value so that the individual transducers show at the most minimum deviations from this standard value. The result can thus be secured that the sensitivity of the finished transducer, expressed at picocoulombs per atmospheric pressure unit (pC./at.) represents a whole number and therefore a simple calculation of the amplitudes in pressure units is permitted when shown on an oscillograph.

The invention is not limited to the embodiment described. Thus for example another crystal arrangement could also be used, for example a hollow cylindrical crystal arrangement, which consists of one or more crystal units; FIG. 5 shows such an arrangement with two crystals 37 and 38. It is however also possible to use a crystal arrangement with ring-shaped crystal plates laminated one upon the other. Further also other piezoelectric crystals and quartz can be used, for example barium titanate.

What we claim is:

1. Piezo-electric transducer comprising several crystal elements assembled in a pressure casing, the crystal elements having surfaces which face each other and define an inner space and run essentially in the directions of the neutral and optical crystal axes of which the neutral axes are directed parallel to the axis of the inner space, characterized in that for taking off the charges from the facing and at least partially metal-plated surfaces (20) of the crystal elements (17) a common helically wound electrode (19) is provided, which is screwed into the inner space and after having reached its end position is tightened and secured by rotating it against its direction of winding.

2. Transducer according to claim 1, characterized in that the crystal elements (17) in cross-section essentially have the form of a section of a circle, and that the at least partially plated outer surface of each section is in direct contact with the pressure casing (13), while the inner flat surfaces (20) of the sections define a prismatic inner space, into which the helical electrode (19) is screwed, which presses at the same time the crystal elements with their outer surfaces against the wall of the pressure casing.

3. Transduced according to claim 2, characterized in that each one of the three piezo-electric crystal elements (17) in form of a section of a circle is ground out of a rectangular crystal prism and that the edges between its outer surface and its inner surface are chamfered so that two parallel surfaces between the outer surface and the inner surface are generated, which serve as insulation surfaces and are not plated.

4. Transducer according to claim 2, further characterized in that the individual crystal elements (17) are provided with different apex heights of the circular section and are selected in respect to their apex heights in such a manner that the sum of their piezo-modulus corresponds to a predetermined value.

5. Transducer according to claim 1, further characterized in that the end of the helical wound electrode (19) projecting from the crystal assembly is anchored to an insulator (22), which is non-rotatably connected with the casing (1).

References Cited by the Examiner

UNITED STATES PATENTS 2,846,496   8/1958   Baumgartner _____ 310—8.7

FOREIGN PATENTS 7,064   3/1903   Great Britain.

OTHER REFERENCES

Russian Bulletin, SOV 119–59–2–425/600.

MILTON O. HIRSHFIELD, *Primary Examiner.*

J. D. MILLER, *Assistant Examiner.*